United States Patent
Black et al.

(10) Patent No.: US 7,978,088 B2
(45) Date of Patent: *Jul. 12, 2011

(54) DEVICE AND METHOD TO PROLONG THE LIFE OF AN ENERGY SOURCE

(75) Inventors: Greg R Black, Vernon Hills, IL (US); John P Boos, Grayslake, IL (US); Mark J Carlson, Round Lake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 372 days.

This patent is subject to a terminal disclaimer.

(21) Appl. No.: 12/129,724

(22) Filed: May 30, 2008

(65) Prior Publication Data
US 2009/0295590 A1 Dec. 3, 2009

(51) Int. Cl.
*G08B 21/00* (2006.01)
(52) U.S. Cl. ............. 340/636.2; 340/636.1; 340/636.11; 320/127
(58) Field of Classification Search ............... 340/636.1, 340/636.2, 636.11, 636.13, 636.15, 636.19; 320/132, 106, 150, 135, 127; 370/252, 328, 370/465; 455/433, 522
See application file for complete search history.

(56) References Cited

U.S. PATENT DOCUMENTS

| | | | |
|---|---|---|---|
| 5,164,652 A | 11/1992 | Johnson et al. | |
| 5,237,257 A | 8/1993 | Johnson et al. | |
| 5,534,765 A | 7/1996 | Kreisinger et al. | |
| 5,717,307 A | 2/1998 | Barkat et al. | |
| 5,815,807 A | 9/1998 | Osmani et al. | |
| 6,677,860 B2 * | 1/2004 | DelRossi et al. | 340/636.1 |
| 6,760,311 B1 | 7/2004 | Raith | |
| 6,789,205 B1 | 9/2004 | Patino et al. | |
| 6,894,459 B2 * | 5/2005 | Howard et al. | 320/150 |
| 7,206,567 B2 | 4/2007 | Jin et al. | |
| 7,233,127 B2 | 6/2007 | Chen et al. | |
| 2002/0093311 A1 | 7/2002 | Stryker et al. | |
| 2004/0048143 A1 * | 3/2004 | Stumpf | 429/61 |

(Continued)

FOREIGN PATENT DOCUMENTS
EP 1883143 B1 12/2009

OTHER PUBLICATIONS

IEEE LIVIUM 1725; IEEE Standard for Rechargeable Batteries for Cellular Telephones; IEEE Std 1725-2006; 82 pages.

(Continued)

*Primary Examiner* — Anh V La
(74) *Attorney, Agent, or Firm* — Gary J. Cunningham

(57) ABSTRACT

A wireless communication device (200) and method (300) adapted to prolong the useful life of an energy storage device is disclosed. In its simplest form, it can include: determining (310) a limit temperature discharge energy rate of an energy storage device; sensing (320) a temperature range threshold in proximity to the energy storage device; and adjusting (330) a discharge energy rate in response to the determined limit temperature discharge energy rate (310) and sensed temperature range threshold (320). The device (200) and method (300) can automatically and dynamically manage current drain of an energy storage device when a certain temperature range threshold is reached, to maintain the energy storage device within desired specifications and tolerances. This can prolong the useful life of the energy storage device and help to maintain a maximum recharging capacity.

20 Claims, 2 Drawing Sheets

U.S. PATENT DOCUMENTS

2005/0101287 A1    5/2005   Jin et al.
2005/0288051 A1   12/2005   Van Bosch
2008/0057984 A1    3/2008   Willey

OTHER PUBLICATIONS

PCT Search Report; Corresponding U.S. Appl. No. 12/129,724; Dec. 18, 2009; 11 pages.

U.S. Appl. No. 12/610,087, filed Oct. 30, 2009; "Device and Method for Temperature Monitoring and Warning"; 25 pages.

U.S. Appl. No. 12/772,369, filed May 3, 2010; "Device and Method for Temperature Monitoring and Warning"; 25 pages.

Lindhardt, Uffe: "The International Search Report and The Written Opinion of the International Searching Authority", European Patent Office, Rijswijk, completed: Aug. 25, 2010, mailed: Aug. 31, 2010, all pages.

Patent Cooperation Treaty, International Search Report and Written Opinion of the International Searching Authority for International Application No. PCT/US2010/037869, Sep. 6, 2010, 12 pages.

\* cited by examiner

DEVICE AND METHOD TO PROLONG THE LIFE OF AN ENERGY SOURCE

BACKGROUND

1. Field

The present disclosure relates to a device and method to prolong the useful life of an energy source.

2. Introduction

Mobile devices are expected to operate over a broad operating temperature range of, for example, from −10° C. to +60° C. Likewise, rechargeable energy storage components used in mobile devices have a corresponding specified operating temperature range. Mobile devices, such as wireless communication devices, have become essential to daily living, and operation at temperatures outside of this temperature range may be required in some circumstances. Operating outside of the specified temperature range is a challenge for rechargeable energy storage components, because such operation can cause reduced energy storage capacity and reduced number of recharging cycles. Energy storage device manufacturers have attempted to address this challenge by allowing limited operation over a wider range of temperatures.

Thus, there is a need for a method and device for providing limited extended temperature range operation and prolonging the useful life of an energy storage device in electronic devices, such as wireless communication devices.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
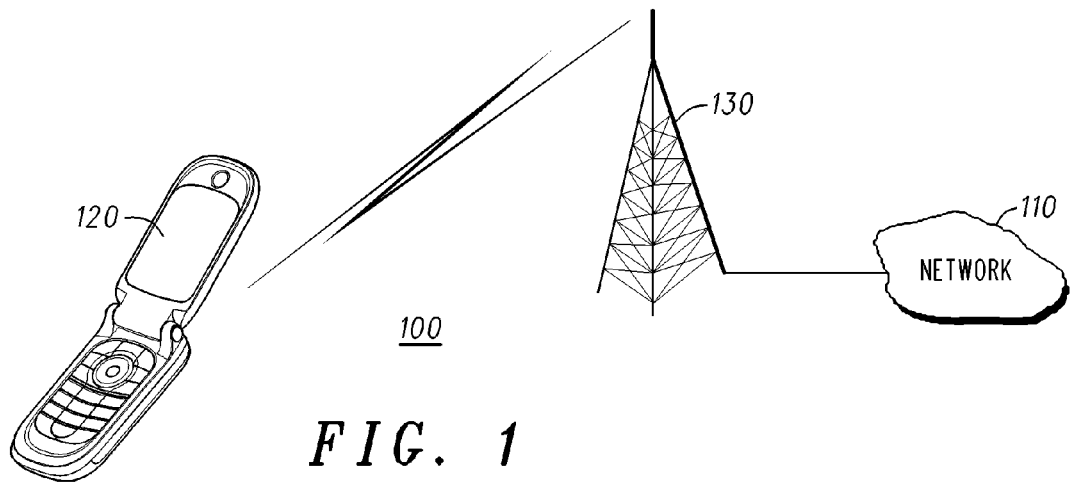
FIG. 1 is an exemplary block diagram of a communication system according to one embodiment.

FIG. 1 is an exemplary block diagram of a system 100 according to one embodiment. The system 100 can include a network 110, a terminal 120, and a base station 130. The terminal 120 may be a wireless communication device, such as a wireless telephone, a cellular telephone, a personal digital assistant, a pager, a personal computer, a selective call receiver, or any other device that is capable of sending and receiving communication signals on a network including wireless network. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, a Third Generation (3G) network, a satellite communications network, and other like communications systems. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminal 120 can communicate with the network 110 and with other devices on the network 110 by sending and receiving wireless signals via the base station 130.

Figure 2:
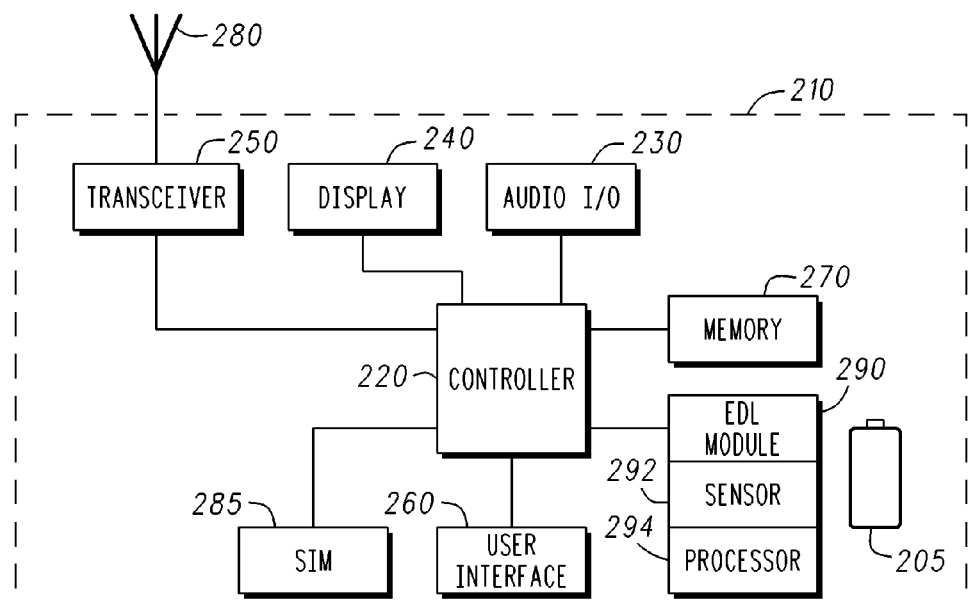
FIG. 2 is an exemplary block diagram of a wireless communication device according to one embodiment.

FIG. 2 is an exemplary block diagram of a wireless communication device 200 configured with an energy storage device 205, such as the terminal 120, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, an antenna 280 coupled to the housing 210 and the transceiver 250, and a removable subscriber module 285 coupled to the controller 220. The wireless communication device 200 further includes an energy discharge limiting module 290 configured to identify an energy storage device, to sense a threshold temperature in proximity to the energy storage device and to adjust a discharge energy rate in response to the identified energy storage device and sensed threshold temperature. In one embodiment, the module 290 includes a sensor 292 and processor module 294, which are coupled to the controller 220. In more detail, the module 290 can reside within the controller 220, can reside within the memory 270, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory or any other memory that can be coupled to a wireless communication device.

In more detail, the wireless communication device 200 shown in FIG. 2, includes: a housing 210; a controller 220 coupled to the housing 210, the controller 220 configured to control the operations of the wireless communication device; memory 270 coupled to the controller 220; memory 270 coupled to the controller 220; a transceiver 250 coupled to the controller 220; and an energy discharge limiting module 290 configured to identify an energy storage device 205, to sense a threshold temperature in proximity to the energy storage device 205 and to adjust a discharge energy rate in response to the identified energy storage device 205 and sensed threshold temperature.

In its simplest form, the wireless communication device is configured with an energy storage device 205. It can include: a housing 210; a controller 220 coupled to the housing, the controller 220 configured to control the operations of the wireless communication device; a transceiver 250 coupled to the controller 220; and an energy discharge limiting module 290 configured to determine a limit temperature discharge energy rate, to sense a temperature range threshold in proximity to the energy storage device and to adjust a discharge energy rate in response to the determined temperature discharge rate and sensed temperature range threshold.

Advantageously, the module 290 can automatically and dynamically manage current drain of an energy storage device 205 when a certain temperature range threshold is reached to maintain the device within desired specifications and tolerances. This can prolong the useful life of the energy storage device 205 and help to maintain a maximum recharging capacity.

In one embodiment, the energy discharge limiting module 290 is configured to adjust and lower the discharge energy rate, below a pre-adjusted discharge energy rate, when outside of the temperature range. For example a battery may be specified to be rechargeable 100 times to an energy level of C mA-hours, provided that it is operated within a temperature range of −10° C. to +60° C., or with a limited current drain of C/10 mA within an extended temperature range. Discharging the battery above the limit current drain while outside of the operating temperature range causes reduced energy storage capacity and a reduced number of recharging cycles. Thus when temperature is outside of the temperature range, either above or below, the discharge limiting module 290 lowers the discharge energy rate to below C/10 mA, in one embodiment. The device is thereby operable over an extended temperature range, albeit with reduced functionality. Note that energy discharge rate actually has units of power, which is the product of current and voltage. However it is customary to specify energy discharge rate from a battery as a current, since the battery voltage level is also specified.

In more detail, energy storage devices, such as 205, have a specified limit temperature discharge energy rate. In one arrangement, the energy discharge limiting module 290 can be configured to adjust the discharge energy rate to below the specified limit temperature discharge energy rate by controlling operation of the wireless communication device 200. In a preferred embodiment, a limit temperature discharge rate is determined by identifying the energy storage device and looking up a specified limit temperature discharge energy rate in at least one of an internal memory and an external data base, the energy discharge limiting module being configured to adjust the discharge energy rate to below the specified limit temperature discharge energy rate. The wireless communication device 200 has configurable features and modes, each requiring power from the energy storage device. For a given configuration the total power required for the enabled features and modes may exceed the specified limit temperature discharge energy rate of the energy storage device 205. However, for a configuration enabling only the most essential or prioritized features and modes, the required power drain is less than the limit temperature discharge energy rate of the energy storage device 205. Non-essential or non-prioritized features and modes are disabled when the temperature is outside of the specified temperature range of the energy storage device 205. The device is thereby operable for essential operations over the extended temperature range of the energy storage device 205, and since the energy drain is below the limit temperature energy discharge limit there is minimal or no reduction in capacity or number of potential charging cycles.

In a preferred embodiment, the energy storage device 205 includes a specified energy capacity C Ampere-hours, and the specified limit temperature discharge energy rate is C/10 Amperes. As should be understood by those skilled in the art, the discharge energy rate can very widely depending on the energy storage device 205 and device it is used in connection therewith. The capacity C for Li-Ion batteries used for mobile phones is, typically, in the range of 500 mA-hours to 2.5 A-hours. The energy drain of mobile phone devices may vary from a few mA to over 1 Amp depending on the device capabilities and configuration. (Note that it is common to use current drain as measure of power, assuming a battery voltage of 3.6V, as is understood in the art.)

The energy discharge limiting module can be configured to: (i) limit an application to a lower discharge energy rate below a pre-adjusted discharge energy rate; (ii) reconfigure the wireless communication device to a lower discharge energy rate below a pre-adjusted discharge energy rate; (iii) change a network registration to a different power class wireless communication device to a lower discharge energy rate below a pre-adjusted discharge energy rate; (iv) change a network registration to a different data rate class wireless communication device to a lower discharge energy rate below a pre-adjusted discharge energy rate; and (v) temporarily disable lower priority applications to provide a lower discharge energy rate below a pre-adjusted discharge energy rate. As should be understood, other examples can be utilized as well.

In connection with item i above, limiting an application to a lower discharge energy rate below a pre-adjusted discharge energy rate may involve disabling applications or adjusting the operating parameters within applications. In an audio player application, for example, the entire application may be disabled, or player modes having to do with input media or file type or output signal paths may be disabled, or parameters such as output signal amplitude may be limited. Applications such as video players and web-browsers may be entirely disabled or may be disabled only for certain media or file input types, or parameters such as display brightness or lighting may be limited. Applications involving data communications may be entirely disabled, or may be disabled for applications involving large amounts of data, in situations where receiver conditions are unfavorable for low power reception, or where the transmitter output power requirement is high, or parameters such as bandwidth and power may be limited.

In connection with item ii, reconfiguring the wireless communication device to a lower discharge energy rate below a pre-adjusted discharge energy rate may involve limiting the available communication modes. For example a multimode device capable wide area network (WAN), local area network (LAN) and personal area network (PAN) capabilities may be reconfigured to enable only the most essential of these, typically the WAN. In the case of devices capable of operation on multiple simultaneous communication networks the number of available networks may be reduced. In this way the power drain from the battery cause by simultaneous WAN, LAN or PAN operations is reduced, and the power drain is limited to power drain from, for example, a single WAN.

In connection with item iii, changing a network registration to a different power class wireless communication device to a lower discharge energy rate below a pre-adjusted discharge energy rate causes a reduction in maximum RF output power of the transmitter and a corresponding limitation in power drain from the battery. For example, a cellular device may be capable of transmitting at 2 watts of output power, corresponding to a GSM power class IV capability. During normal temperature range operation the device registers on the GSM network as a power class IV device, such that in data transferring or voice calling application the network controls the device to transmit up to 2 Watts. At extreme temperatures the device may register on the GSM network as a power class V device, such that the network controls the device to transmit at up to 800 m Watts. In this way the transmitter maximum output power may be reduced which causes a corresponding reduction in power drain from the transmitter and thereby causes a limiting of the power drain from the battery.

In connection with item iv, changing a network registration to a different data rate class wireless communication device to a lower discharge energy rate below a pre-adjusted discharge energy rate causes a reduction in maximum power drain in the radio transmitter and the receiver and a corresponding limitation in power drain from the battery. For example, a cellular device may be capable of a highest data rate corresponding to a modulation and coding scheme 9 (MCS-9). During normal temperature range operation it registers on the cellular network as an MCS-9 device. At extreme temperatures the device may register a lower data rate capability such as MCS-1, such that the network controls the device to transmit and receive data at a lower maximum rate. The lower data rate operation requires less transmitter and receiver processing capability and correspondingly lower power drain in radio transmitter and receiver, and thereby causes a limiting of power drain from the battery.

And in connection with item v, temporarily disabling lower priority applications to provide a lower discharge energy rate below a pre-adjusted discharge energy rate may involve disabling non-essential features, modes, programs, or services. Some examples of reception of non-essential broadcast data, can include AM or FM radio or television, media players for entertainment, games, etc. This causes a reduction in power drain in the broadcast receivers, microprocessors, displays and audio circuits, for example, employed by the device 200 to implement these applications. In this way the power drain from the battery corresponding to these applications is limited.

In another arrangement, the energy discharge limiting module 290 can be configured to identify and provide a specification detailing the temperature dependent discharge limit for the energy storage device. For example, this can be done by identifying the battery type. Battery type information may include the manufacturer, manufacturer part number, capacity information from the manufacturer, measured capacity, temperature range or threshold, extreme temperature discharge rate, etc. Assuming just a battery part number is identified, a corresponding specification may be determined from non-volatile memory in the device, or by requesting that information from an external data base. For example, a battery part number may be identified by querying the battery, and the temperature limit and discharge rate limit may then be looked up in a data base.

The energy discharge limiting module 290 can be configured to identify and authenticate the energy storage device 205, as being acceptable for use in the wireless communication device. This can be done by generating and sending a random number challenge to the battery, encoding the random number with a proprietary encryption method, receiving a response from the battery, and if the response matches the encoded random number the battery is determined to be authentic. In this way the battery can be determined as being from a trusted supplier, and the identified or determined battery specification, is validated.

The energy storage device 205 can include at least one of: a battery, a fuel cell, a fuel container and an electrochemical capacitor. In a preferred embodiment, it is a battery such as, a lithium ion cell or a nickel metal anhydride cell, such cells having reasonably large energy capacity, wide operating temperature range, large number of charging cycles, and long useful life. For a lithium ion battery cell the operating temperature range may be $-10°$ C. to $60°$ C. For a nickel metal anhydride cell the temperature range may be wider, for example $-20°$ C. to $+75°$ C. For a hydrogen fuel cell it may be considerably narrower, for example $0°$ C. to $+45°$ C. Even with a given cell technology there may be differences in the temperature range specified by the cell supplier. In some cases the temperature range may be unbounded on the lower or upper temperature limit. For example, a lithium ion cell supplier may only specify an upper operating temperature range of $60°$ C. Thus there may be significant differences in the operating temperature range of the energy storage device 205.

In one arrangement, a signal indicator is provided for alerting a user that the energy discharge limiting module has been triggered. Examples can include and are not limited to a visual signal, audible signal and tactile activity.

In one embodiment, a data bus configured for conveying at least one of energy storage device identification data and a limit temperature discharge energy rate data from the energy storage device to the energy discharge limiting module 290 is provided. The identification data is then used to look-up the battery specification including an extreme temperature energy discharge rate limit. Preferably, the data bus is further configured to convey temperature threshold detection data from the energy storage device 205 to the energy discharge limiting module 290. Alternatively, the temperature and the extreme temperature energy discharge rate limit could be conveyed directly from the energy storage device 205 to the energy discharge limiting module 290 over the data bus.

Figure 3:
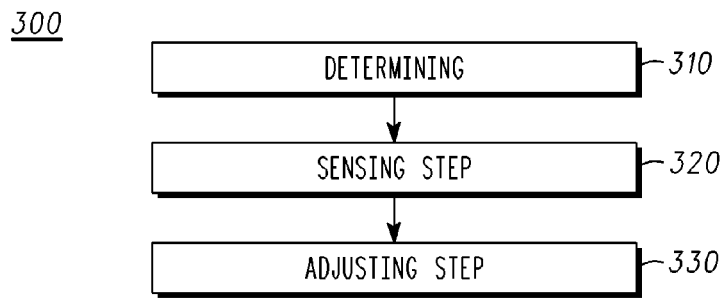
FIG. 3 is an exemplary block diagram of a method to prolong the useful life of an energy source according to one embodiment.

Referring to FIG. 3, a method 300 adapted to prolong the useful life of an energy storage device is shown. In its simplest form, it can include: determining 310 a limit temperature discharge energy rate of an energy storage device; sensing 320 a temperature range threshold in proximity to the energy storage device; and adjusting 330 a discharge energy rate in response to the determined limit temperature discharge energy rate 310 and sensed temperature range threshold 320. The device 200 and method 300 can automatically and dynamically manage current drain of an energy storage device when a certain temperature range threshold is reached, to maintain the energy storage device within desired specifications and tolerances. This can prolong the useful life of the energy storage device and help to maintain a maximum recharging capacity.

Advantageously, the method can dynamically manage the energy storage device to help prolong its useful life and help maintain it within desired specifications and tolerances. For example, a mobile communication device may employ a hybrid energy storage device comprising a fuel cell having a lower operating temperature limit of $0°$ C., and a small electrochemical capacitor which can operate below $0°$ C. but having a lower output power capability. Upon power up below $0°$ C., the device identifies the energy sources and the energy discharge limiting module 290 determines that the energy discharge limit of the electrochemical capacitor is required, and limits communication functions accordingly. For example, it may limit the data rate capability. After operating for a period of time, a $0°$ C. temperature threshold is detected and the energy discharge limiting module 290 controls the mobile communication device to enable a higher data rate capability. In this way the mobile communication device is available for essential voice or text messaging communications while operating at extreme temperatures, and becomes available for higher data rate communications such as video sharing or web-browsing when operating within the specified normal temperature range.

In a preferred application, the adjusting step 330 can include lowering the discharge energy rate, below a pre-adjusted discharge energy rate, when above the threshold temperature. In more detail, the adjusting step 330 can include lowering the discharge energy rate below a specified limit temperature discharge energy rate of the energy source. For example, the specified limit temperature discharge energy rate can be C/10 Amperes, wherein the energy storage device has a specified energy capacity of C Ampere-Hours.

The adjusting step 330 can include, for example: limiting an application to a lower discharge energy rate below a pre-adjusted discharge energy rate; reconfiguring the wireless communication device to a lower discharge energy rate below a pre-adjusted discharge energy rate; changing a network registration to a different power class wireless communication device to a lower discharge energy rate below a pre-adjusted discharge energy rate; changing a network registration to a different data rate class wireless communication device to a lower discharge energy rate below a pre-adjusted discharge energy rate; temporarily disabling lower priority applications to provide a lower discharge energy rate below a pre-adjusted discharge energy rate and the like.

The determining step 310 can include identifying an energy storage device; looking up a specified limit temperature discharge energy rate in at least one of an internal memory and an external data base, and lowering the discharge energy rate below a pre-adjusted discharge energy rate when above the threshold temperature. This can involve providing a specification detailing a temperature dependent energy discharge rate limit for the energy storage device and authenticating the energy storage device as being acceptable for use in the wireless communication device. In this way the user is ensured that the energy storage device is used in accordance with an approved supplier's specification, and therefore the device will not have degraded capacity or reduced number of recharging cycles. More generally, the user will not suffer adverse performance due to operating of the energy storage device outside of a normal operating temperature range as specified by a trusted supplier.

The method 300 can further include providing an adjustment indicator including at least one of a visual signal, audible signal and tactile activity, for example, to alert a user of this activity.

Figure 4:
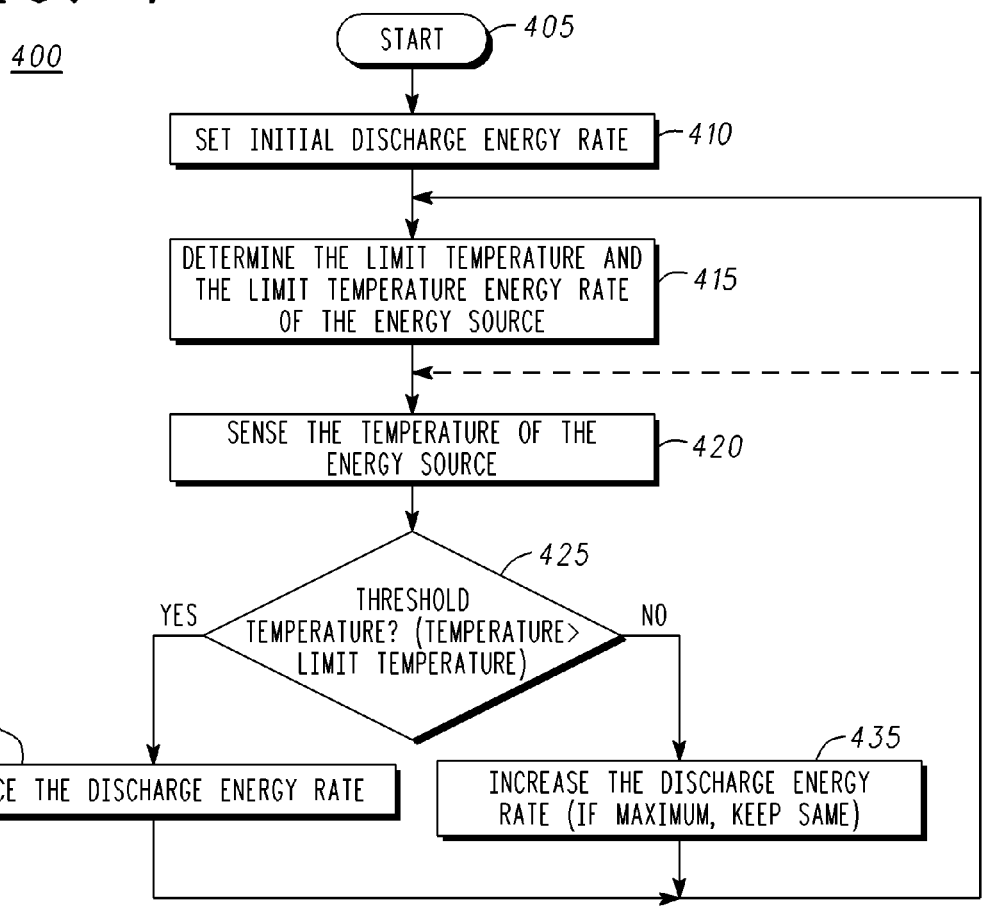
FIG. 4 is an exemplary flowchart illustrating the operation of a method to prolong the useful life of an energy source according to another embodiment.

FIG. 4 is an exemplary flowchart 400 illustrating the operation of the module 290, according to one embodiment. At 405, the flowchart begins. In first step 410, an initial discharge energy rate is set. This would typically be above the maximum required power drain of the device operating with full functionality. In a second step 415, the limit temperature and limit temperature energy rate of the energy source are determined. In a third step 420, the temperature of the energy source is sensed. In decision box 425, the inquiry is: Has the threshold temperature been met? If the inquiry at box 425 returns a 'yes', the flowchart proceeds to box 430 and the discharge energy rate is reduced by limiting operations of the communications device. If the inquiry at box 425 returns a 'no', the flowchart proceeds to box 435 and the discharge energy rate is increased by removing limitations on the operations of the communications device. If, at box 425, there are not any limitations on the operations of the radio communication device then there is no change, and the device remains operating at its full capability. Alternatively, determining the limit temperature in step 415 and sensing the temperature at step 420 may be combined into the decision box 425 in such a way that a limit temperature state may be detected directly without temperature and temperature limit inputs.

The device 200 and method 300 are preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A wireless communication device configured with an energy storage device, comprising:
   a housing;
   a controller coupled to the housing, the controller configured to control the operations of the wireless communication device;
   a transceiver coupled to the controller; and
   an energy discharge limiting module configured to determine a limit temperature discharge energy rate specified for an energy storage device, to sense a temperature range threshold in proximity to the energy storage device and to adjust a discharge energy rate to below the specified limit temperature discharge energy rate, in response to the sensed temperature range threshold.

2. The wireless communication device of claim 1, wherein the energy discharge limiting module is configured to adjust and lower the discharge energy rate, below a pre-adjusted discharge energy rate, when outside of the temperature range threshold.

3. The wireless communication device of claim 1, wherein the limit temperature discharge rate is determined by identifying the energy storage device and looking up a specified limit temperature discharge energy rate in at least one of an internal memory and an external data base, the energy discharge limiting module being configured to adjust the discharge energy rate to below the specified limit temperature discharge energy rate.

4. The wireless communication device of claim 3, wherein the energy storage device has a specified energy capacity C Ampere-hours, and the specified limit temperature discharge energy rate is C/10 Amperes.

5. The wireless communication device of claim 1, wherein the energy discharge limiting module is configured to, at least one of: limit an application to a lower discharge energy rate below a pre-adjusted discharge energy rate; reconfigure the wireless communication device to a lower discharge energy rate below a pre-adjusted discharge energy rate; change a network registration to a different power class wireless communication device to a lower discharge energy rate below a pre-adjusted discharge energy rate; change a network registration to a different data rate class wireless communication device to a lower discharge energy rate below a pre-adjusted discharge energy rate; and temporarily disable lower priority applications to provide a lower discharge energy rate below a pre-adjusted discharge energy rate.

6. The wireless communication device of claim 1, wherein the energy discharge limiting module is configured to identify and authenticate the energy storage device as being acceptable for use in the wireless communication device.

7. The wireless communication device of claim 1, wherein the energy storage device includes at least one of: a battery, a fuel cell, a fuel container and an electrochemical capacitor.

8. The wireless communication device of claim 1, further comprising a signal indicator for alerting a user that the energy discharge limiting module has been triggered.

9. The wireless communication device of claim 1, further including a data bus configured for conveying at least one of energy storage device identification data and a limit temperature discharge energy rate data from the energy storage device to the energy discharge limiting module.

10. The wireless communication device of claim 9, wherein the data bus is further configured to conveying temperature threshold detection data from the energy storage device to the energy discharge limiting module.

11. A wireless communication method, comprising:
determining a limit temperature discharge energy rate specified for an energy storage device by an energy discharge limiting module;
sensing a temperature range threshold in proximity to the energy storage device; and
adjusting a discharge energy rate to below the specified limit temperature discharge energy rate, in response to the sensed temperature range threshold.

12. The wireless communication method of claim 11, wherein the determining step includes identifying an energy storage device;
looking up a specified limit temperature discharge energy rate in at least one of an internal memory and an external data base, and
lowering the discharge energy rate below a pre-adjusted discharge energy rate when outside of the temperature range threshold.

13. The wireless communication method of claim 11, wherein the adjusting step includes lowering the discharge energy rate below the determined limit temperature energy discharge rate of the energy storage device.

14. The wireless communication device of claim 13, wherein the specified limit temperature discharge energy rate is C/10 Amperes, and the energy storage device has a specified energy capacity of C Ampere-Hours.

15. The wireless communication method of claim 11, wherein the adjusting step includes at least one of: limiting an application to a lower discharge energy rate below a pre-adjusted discharge energy rate; reconfiguring the wireless communication device to a lower discharge energy rate below a pre-adjusted discharge energy rate; changing a network registration to a different power class wireless communication device to a lower discharge energy rate below a pre-adjusted discharge energy rate; changing a network registration to a different data rate class wireless communication device to a lower discharge energy rate below a pre-adjusted discharge energy rate; and temporarily disabling lower priority applications to provide a lower discharge energy rate below a pre-adjusted discharge energy rate.

16. The wireless communication method of claim 11, wherein the determining step includes providing a specification detailing a temperature dependent energy discharge rate limit for the energy storage device.

17. The wireless communication method of claim 12, wherein the identifying step includes authenticating the energy storage device as being acceptable for use in the wireless communication device.

18. The wireless communication method of claim 11, wherein energy storage device includes at least one of: a battery, a fuel cell, a fuel container and an electrochemical capacitor.

19. The wireless communication method of claim 11, further comprising providing an adjustment indicator including at least one of a visual signal, audible signal and tactile activity.

20. A method including a device configured with an energy storage device, comprising:
providing a wireless communication device, configured to send and receive wireless signals, the wireless communication device including an energy storage device and controller configured to control the operations of the wireless communication device;
identifying a limit temperature discharge energy rate specified for the energy storage device;
sensing a threshold temperature in proximity to the energy storage device; and
adjusting a discharge energy rate to below the specified limit temperature discharge energy rate, in response to the sensed threshold temperature.

* * * * *